United States Patent [19]

Masley

[11] Patent Number: 5,765,727
[45] Date of Patent: Jun. 16, 1998

[54] SOLID RUBBER TIRE SEPARATION METHOD

[75] Inventor: Max Masley, Etobicoke, Canada

[73] Assignee: TPR Inc., Wilmington, Del.

[21] Appl. No.: 782,387

[22] Filed: Jan. 13, 1997

Related U.S. Application Data

[63] Continuation of Ser. No. 355,688, Dec. 14, 1994, abandoned.

[51] Int. Cl.$^6$ .............................. B26F 3/02; B60C 25/132
[52] U.S. Cl. ............................ 225/3; 225/1; 225/94; 29/426.4; 83/951; 157/1.17
[58] Field of Search .................... 83/54, 951, 639.1, 83/620; 225/1, 3, 6, 7, 21, 22, 23, 24, 93, 94; 29/426.4, 700, 403.1, 403.3; 157/1.17, 1.1, 1; 241/DIG. 31

[56] References Cited

U.S. PATENT DOCUMENTS

| | | | |
|---|---|---|---|
| 2,228,086 | 1/1941 | Rodgers | 157/1 |
| 3,279,289 | 10/1966 | Wendricks | 83/19 |
| 3,658,267 | 4/1972 | Burwell | 241/301 |
| 3,693,894 | 9/1972 | Willette | 241/279 |
| 3,898,899 | 8/1975 | Weinstein | 83/29 |
| 3,921,482 | 11/1975 | Osborn | 83/54 |
| 3,922,942 | 12/1975 | Fawcett et al. | 83/620 |
| 4,137,101 | 1/1979 | Stock | 148/9 R |
| 4,183,392 | 1/1980 | Kane | 157/1.1 |
| 4,216,916 | 8/1980 | Tupper | 241/36 |
| 4,218,818 | 8/1980 | Panzica | 29/426.4 X |
| 4,283,826 | 8/1981 | Miller | 29/426.4 X |
| 4,338,839 | 7/1982 | Farrell, Sr. et al. | 83/620 |
| 4,355,556 | 10/1982 | Ulsky | 83/54 |
| 4,394,983 | 7/1983 | Ulsky | 241/243 |
| 4,694,716 | 9/1987 | Sakamoto | 83/112 |
| 4,914,994 | 4/1990 | Barclay | 83/951 |
| 5,001,828 | 3/1991 | Missman | 29/426.4 X |
| 5,267,496 | 12/1993 | Roach et al. | 83/133 |
| 5,299,748 | 4/1994 | Brewer | 241/279 |

FOREIGN PATENT DOCUMENTS

| | | | |
|---|---|---|---|
| 3204765 | 8/1983 | Germany | 157/1.17 |
| 52-054779 | 10/1975 | Japan . | |
| 937-014 | 11/1980 | U.S.S.R. . | |
| 1473977 | 4/1989 | U.S.S.R. | 157/1.1 |
| 1685-722 | 9/1989 | U.S.S.R. . | |
| 1535749 | 1/1990 | U.S.S.R. | 157/1.1 |
| 1397067 | 6/1975 | United Kingdom | 157/1.1 |
| 2003073 | 3/1979 | United Kingdom | 29/426.4 |

Primary Examiner—Eugenia Jones
Assistant Examiner—Charles Goodman
Attorney, Agent, or Firm—Fitzpatrick, Cella, Harper & Scinto

[57] ABSTRACT

A tire separation method employs a cutting head and a press for separating treads from rims of solid rubber tires. The cutting head has an annular blade with a blunt edge for tearing the rubber from the rim of the tire. Three spoke blades are spaced apart around the annular blade for cutting the diameter of the tread into sections. The rim drops through the annular blade to a conveyor, while the tread sections fall away to tread conveyors. The tires are brought from storage on a tire conveyor. The press has a hydraulic cylinder driving a piston with a jaw-type clamping mechanism for picking up tires. The cylinder is on a carriage that is movable from over the cutting head to over the tire conveyor for picking up tires to bring them over the cutting head for separating.

16 Claims, 2 Drawing Sheets

SOLID RUBBER TIRE SEPARATION METHOD

This application is a continuation of application Ser. No. 08/355,688, filed Dec. 14, 1994, now abandoned.

FIELD OF THE INVENTION

The invention relates to the reclamation of rubber from tires. More particularly, it relates to removing rubber from the rim of solid rubber tires.

BACKGROUND OF THE INVENTION

Every year millions of solid rubber tires around the world come to the end of their useful life; estimates indicate over 1.5 million every year in the United States alone. Disposal is a significant problem. Recycling is desirable for both environmental and economic reasons.

Solid rubber tires typically consist of a tubular steel rim and a solid rubber tread. In production of the tire, the rim is treated to prepare for rubber bonding and the rubber is compression moulded to the steel and vulcanized. The resulting bond between the tread and rim is very strong.

Solid rubber tires are mainly used for forklift trucks, military, mining and agricultural applications. Their weight, traction properties and immunity to punctures are particularly attractive in these fields.

The number of solid rubber tires used per year is much smaller than the number of pneumatic automotive tires used; so the disposal of solid rubber tires has not attracted as much attention. Currently, many jurisdictions are not regulating the disposal of solid rubber tires. Given the experience with automotive tires, this is likely to change making recycling mandatory.

In any event, recycling is desirable because the components of solid rubber tires have relatively high economic value, certainly more than an automotive tire. The rubber is of better quality as it is generally being made of a higher percentage of natural rubber. The remainder of the rubber is usually artificially derived from fossil products, such as coal. The tread of a solid rubber tire is not contaminated with steel belts, fabric and other materials. As well, there is generally more rubber per tire, typically around 27 lbs. The steel rim can by recycled. Alternatively, it is potentially reusable in the production of a new solid rubber tire. If this can be achieved, it has a higher value as the step of manufacturing the rim is saved.

It is known to heat the rim so that the rubber melts and the rim drops out of the tire. In order to carry out this process, the rim is often red-hot. This is inefficient in terms of the time and energy used. Fumes are released from the rubber and can create an environmental hazard. The steel anneals and is not as valuable. The properties of the rubber are also changed and it is not as valuable.

It is also known to burn the tread and leave the steel rim for recycling. For obvious reasons, this is even less desirable than heating the rim.

It is an object of the invention to address these or other problems with the removal of solid rubber treads from rims.

SUMMARY OF THE INVENTION

The invention can provide a simple, quick, clean, cost effective way of removing a tread from a rim with little damage to the rubber or the rim.

In a first aspect the invention provides a cutting head for use with a tire having a tubular rim integrally surrounded by a solid tread. The cutter has an annular blade of greater internal diameter than the external diameter of the rim. The annular blade has an annular cutting edge for cutting through the tread about the rim to separate a substantial portion of the tread from the rim.

The annular cutting edge may be blunt with an internal diameter sufficiently close to that of the external diameter of the rim that the tread tends to peel from the rim as the annular cutting edge cuts the tread.

The cutting head may also have a generally tubular body extending from the annular cutting edge. The axis of the body is aligned with that of the annular blade for allowing passage of the rim through the blade and body separate from the separated portion of the tread.

The body may have an internal diameter greater than that of the internal diameter of the annular blade for increased ease of passage of the rim through the body.

The cutting head may also have at least one spoke blade extending outwardly from the annular blade for cutting through the diameter of the tread. Each spoke blade may have a spoke cutting edge projecting beyond the annular cutting edge away from the body for cutting at least a portion of the diameter of the tread prior to the annular cutting edge cutting the tread.

Each spoke blade may have a centering surface angled toward the internal diameter of the annular blade for receiving the rim and directing it toward the internal diameter of the annular blade. The centering surface may extend inwardly so that it is flush with the internal diameter of the annular blade.

In a second aspect the invention provides a tire separation system for use with a tire having a tubular rim integrally surrounded by a solid tread. The system uses the cutter of the first aspect and the press may have a hydraulic cylinder and a piston. The hydraulic cylinder is for extending the piston and causing the relative motion. A clamping mechanism may be used to clamp the piston to the internal circumference of the rim of a tire.

The clamping mechanism and the cutting head may be movable relative to one another between a first position for aligning the clamping mechanism with a tire from storage and a second position for aligning a tire on the clamping mechanism with the cutting head.

The system may employ a tire conveyor for conveying tires from storage, at least one tread conveyor for conveying away separated treads, and a rim conveyor for conveying away separated rims.

In a third aspect, the invention provides a method of separating a solid tire tread integrally surrounding a generally tubular rim. The method uses the steps of cutting through the tread about the rim with an annular blade having an annular cutting edge of greater internal diameter than the external diameter of the rim to separate a substantial portion of the tread from the rim.

The method may also use the steps of using a press to cause relative motion between the annular blade and the tire with sufficient force to cause the annular blade to cut through the tread.

The method may further use the steps of using a hydraulic cylinder to extend a piston for causing the relative motion between the annular blade and the tire.

BRIEF DESCRIPTION OF THE DRAWINGS

For a better understanding of the present invention and to show more clearly how it may be carried into effect, reference will now be made, by way of example, to the accompanying drawings which show the preferred embodiment of the present invention and in which.

DETAILED DESCRIPTION OF THE PREFERRED EMBODIMENT

Figure 1:
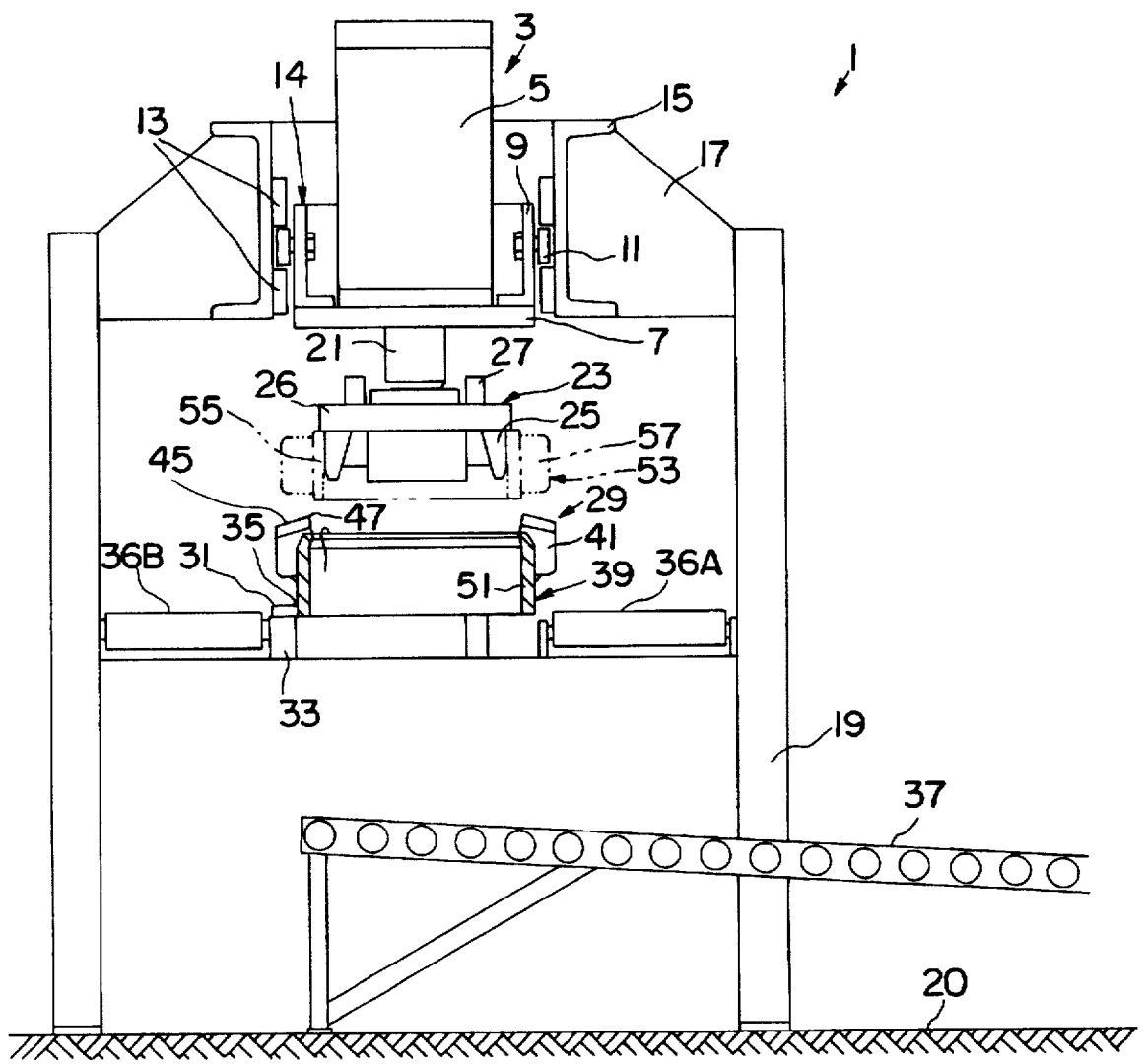
FIG. 1 is a cross-section of a press and a cutting head according to the preferred embodiment of the present invention.

Referring to FIG. 1, a tire separation system 1 has a press 3 with a hydraulic cylinder 5 on a plate 7. The plate 7 is supported on either side by L-brackets 9 connected to wheels 11. There are two wheels 11, front and back, connected to each L-bracket 9 and powered by a motor or cylinder, not shown. The wheels 11 rest in upper and lower guides 13 for motion, forward and back. The plate 7, brackets 9, and wheels 11 act as a carriage 14 for the cylinder 5. The guides 13 are supported by C-brackets 15 connected by respective gussets 17 to columns 19. The columns 19 are steel reinforced and bolted to floor 20. The cylinder 5 has a piston 21 projecting through the plate 7 and connected to a clamping mechanism 23. The clamping mechanism 23 has sliding jaws 25 extending from a disc 26. The jaws 25 are actuated by pneumatic cylinders 27 above the disc 26. As clearly depicted in FIG. 1, the clamping mechanism 23 has an outside diameter which is greater than the inside diameter of rim 55, but is less than the outside diameter of rim 55. Note that the jaws 25 extend inside the interior of rim 55.

Between the columns 19, beneath the clamping mechanism 23, is a cutting head 29 with several feet 31 projecting outwardly. The feet 31 rest on steel supports 33 and are fixed in place by bolts 35. Surrounding the cutting head 29 are a front tread conveyor, not shown, side tread conveyors 36A, 36B, and a rear tread conveyor, not shown. Beneath the cutting head 29 is a rim conveyor 37. Behind the cutting head 29 is a tire conveyor, not shown.

The cutting head 29 has an annular blade 39 and three or more spoke blades 41. The annular blade 39 has a relatively blunt cutting edge 43, while the spoke blades 41 have very hard and sharp cutting edges 45. On the preferred embodiment, the blunt edge 43 had a radius of curvature of approximately 10 thousandths of an inch where the edge 43 contacts the tread 57 next to the rim 55, however a similar effect could be produced with shorter radii. The cutting head 29 is formed from high carbon steel hardened to 58 to 62 HRC. The cutting edge 45 of each spoke blade 41 projects above the cutting edge 43 of the annular blade 39. The blades 41 are flush with the internal circumference of the cutting edge 43. The cutting edge 45 has a peak 47 spaced outwardly from the internal circumference of the cutting edge 43. The edge 45 angles fairly quickly from the peak 47 toward the internal circumference of the cutting edge 43 (approximately 5° from vertical in the preferred embodiment) creating a centering surface 48, while the edge 45 angles fairly slowly down and away from the peak 47 in the opposite direction (approximately 15° from horizontal in the preferred embodiment). The peak 47 is approximately ⅛ to ¼ inch from the internal circumference of the cutting edge 43. The centering surface 48 is itself blunt. Each spoke blade 41 also widens out from its cutting edge 45 to part way down the blade 41 where the thickness remains constant to the bottom of the blade 41.

The cutting edge 43 of the annular blade 39 projects inwardly from a generally tubular body 51 so that the internal circumference of the cutting edge 43 is smaller than the internal circumference of the body 51. The body 51 provides support to the cutting edge 43 and is sized to fit the particular tire being separated. The thickness of the main portion of the body 51 away from the cutting edge 43 is approximately 0.5 inches in the preferred embodiment shown in the Figures.

In operation, a tire 53 is conveyed to the press 3 on the tire conveyor. The carriage 14 is moved to the rear of the press 3 so that the clamping mechanism 23 is above the tire 53. The piston 21 is extended so that the disc 26 meets a rim 55 of the tire 53. The jaws 25 are pivoted outwardly by the cylinders 27 to engage the rim 55 and clamp the tire 53 to the press 3.

The cylinder 5 is retracted and the carriage 14 is moved to the front of the press 3 so that the tire is centred on the cutting head 29. The piston 21 is again extended so that a tread 57 of the tire 53 comes into contact with the peak 47 of the cutting edge 45. The cutting edge 45 can be as sharp as possible as it is used only to sever the diameter of the tread 57. The sharper the cutting edge 45, the more efficiently this function is performed.

The internal diameter of the cutting edge 43 is slightly larger than the external diameter of the rim 55. Notwithstanding the nominal size of a rim 55, the external diameter is likely to vary as much as ¹⁄₁₆" from rim 55 to rim 55. It has been found that the system 1 works adequately with an extra few thousandths of an inch beyond this.

If the tire 53 is off-center with the cutting head 29, the rim 55 will come into contact with the centering surface 48 centering the tire. At least three spoke blades 41 are advisable for taking advantage of the centering feature. The spoke blades 41 need to be sufficiently hard to withstand repeated contact with rim 55.

As the piston 21 pushes the tire 53 further into the cutting head 29, the tread 57 comes into contact with the cutting edge 43 of the annular blade 39. As the cutting edge 43 is fairly blunt, sufficient force has to be applied to the piston 21 to drive the tread 57 onto the blade 39. The required force will depend on the diameter of the rim 55, the thickness of the tread 57, and the density of rubber in the tread 57, among other factors. The force required for typical tires from 6" to 32" in diameter would usually fall within a range of from 2 to 20 tons, however it will vary with the particular set-up in question.

Figure 2:
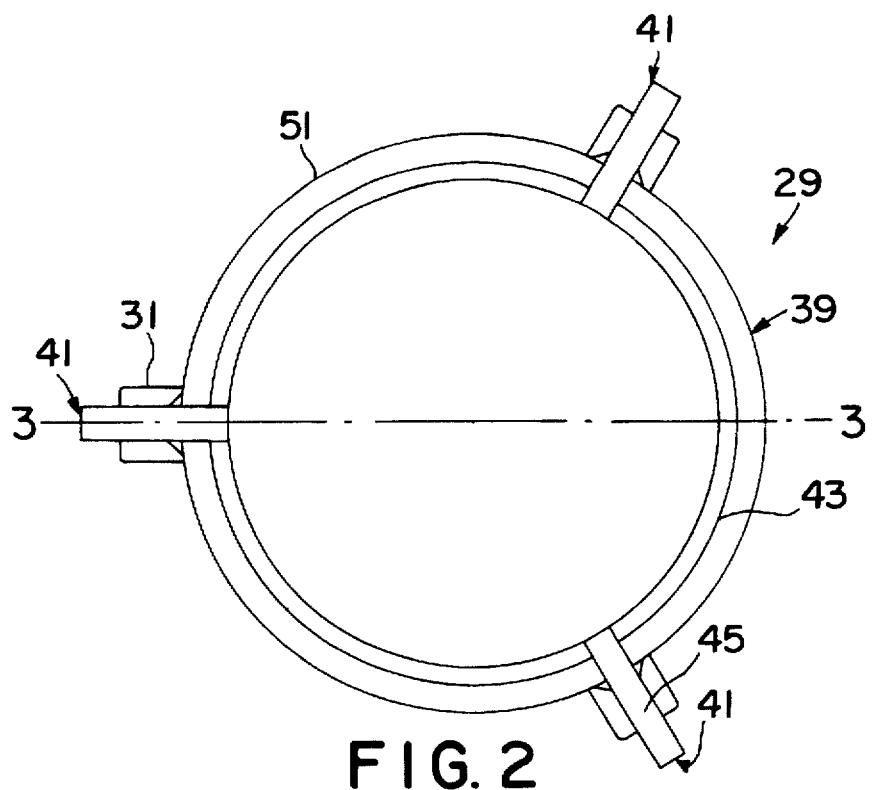
FIG. 2 is a plan view of the cutting head of FIG. 1.
Figure 3:
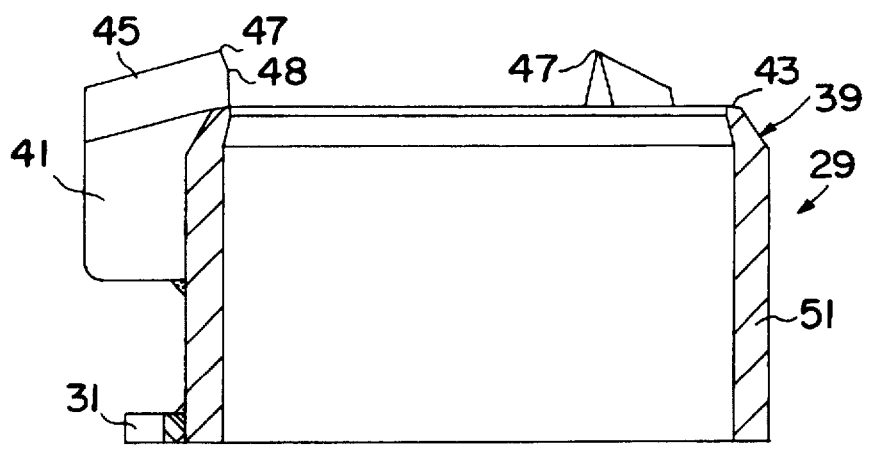
FIG. 3 is a cross-section of the cutting head of FIG. 1 along the lines B–B' of FIG. 2.

A blunt cutting edge 43 is used to increase the amount or rubber taken from the rim 55. A blunt cutting edge 43 actually tends to tear away the rubber in the tread 57 from the rim 55. If a sharp edge were used, it would tend to slice through the rubber, leaving extra rubber on the rim 55. This might not be a concern if the blade 39 could come sufficiently close to the rim 55, however this is generally not possible due to the tolerances in the diameter of the rim 55. As clearly depicted in FIGS. 2 and 3, the blunt cutting edge 43 has a continuous annular surface which is substantially parallel to a plane that is orthogonal to said longitudinal axis.

In addition to centering the tire 53, the spoke blades 41 cut it across its width and break the tension that might otherwise appear in the tread 57 as the annular blade 39 enters into the tread 57. With sufficient force applied to the piston 21 and with a means to release the tire 53 from the annular blade 39, the spoke blades are not essential. The tire 53 could possibly be released by drawing the piston 21 back through a fixed ring, not shown or by using a second piston, not shown, to knock the tread 53 off the annular blade 39. Both the force and release problem could be lessened by adding a lubricant and sharpening the annular blade 39; however this would negate the tearing effect of the blunt annular edge.

Alternatively one spoke blade 41 could be used to release the tension; however two spoke blades 41 are needed if the tread is to be split into sections to allow it to fall away on either side to conveyors. It has been found that separated sections of tread 57 tend to stick to cutting heads with only two spoke blades 41 due to the 180 degree curvature left on each separated section. This tendency is not as great when three spoke blades 41 are used. This is an additional benefit to using three spoke blades 41.

When the tread 57 is completely separated from the rim 55, it will be in three sections, and each section will drop onto one of the front, rear or side 36A, 36B conveyors. If a section falls onto a front or rear conveyor, it will be conveyed to side conveyor 36A or 36B respectively. Sections on side conveyors 36A or 36B will be conveyed away from the system 1 for further processing, storage, transportation or the like.

The rim 55 will drop through the body 51 of the cutting head 29 onto the rim conveyor 37 and is similarly conveyed away from the system 1.

The cutting head 29 may be unbolted at the bolts 35 and replaced by a different size cutting head 29 for different size tires 53. Control of the system 1 may be manual or automated depending on the level of operator input desired. The system 1 lends itself to complete computer control for unattended operation. The system 1 provides a quick, efficient and clean way to separate the rim 55 and tread 57 without damage to either the rim 55 or tread 57.

Although the system 1 has been described with the clamping mechanism 23 above the cutting head 29, it will be understood by those skilled in the art that alternate systems could be created that are otherwise configured. For example, the cutting head 29 could be positioned at the end of the piston 21 with a clamping mechanism beneath. The tire 53 would be brought to the clamping mechanism. The clamping mechanism would be clamped to the rim 55 and the cutting head 29 brought down through the tread 57. The front and rear, side 36A, 36B, tire, and rim 37 conveyors would need to be reconfigured accordingly. For example the tire conveyor could be above the clamping mechanism and convey the tire 53 to a position from which the tire 53 could be dropped onto the clamping mechanism. The tread 57 could separate onto conveyors as in the system 1. The clamping mechanism could lower beneath the tread conveyors and tilt to drop the rim 55 onto a rim conveyor running beneath the tread conveyors.

It will be understood by those skilled in the art that this description is made with reference to the preferred embodiment and that it is possible to make other embodiments employing the principles of the invention which fall within its spirit and scope as defined by the following claims.

I claim:

1. A method of separating a solid rubber tire tread from a solid tubular rim, where the rim has (i) a longitudinal axis, (ii) an external circumference molded to the solid rubber tire tread, and (iii) an external diameter, the solid rubber tire tread having a thickness measured parallel to the longitudinal axis of the rim, the method comprising the steps of:

substantially centering an annular blade about the longitudinal axis of the solid tubular rim, the annular blade having a solid, blunt annular cutting edge of greater internal diameter than the external diameter of the solid tubular rim, and the annular cutting edge facing the solid rubber tire tread, said blunt cutting edge having a continuous annular surface which is substantially parallel to a plane that is orthogonal to said longitudinal axis; and causing relative motion between the annular cutting edge of the annular blade and the solid rubber tire tread substantially in line with the longitudinal axis of the solid tubular rim with sufficient force to cause the annular cutting edge of the annular blade to tear through the entire thickness of the solid rubber tire tread about the entire external circumference of the solid tubular rim to separate the molded solid rubber tire tread from the solid tubular rim.

2. The method of claim 1, further comprising the step of:

using a press for causing the relative motion between the annular blade and the solid rubber tire tread with sufficient force to cause the annular blade to tear through the solid tire tread.

3. The method of claim 2, wherein the press comprises a hydraulic cylinder and a piston, the hydraulic cylinder for extending the piston and causing the relative motion between the annular blade and the solid rubber tire tread.

4. A method according to claim 1, further comprising the step of positioning a mechanism against said solid tubular rim on an opposite side of said rim with respect to said annular blade to support the tubular rim while the blade tears the solid rubber tire tread from the rim.

5. A method according to claim 4, wherein said step of positioning said mechanism includes the step of positioning an outside edge of said mechanism outside an inside diameter of said rim but inside the external diameter of said rim.

6. A method according to claim 5, further comprising the step of holding said mechanism stationary while moving said annular blade to tear the solid rubber tire tread from the solid tubular rim.

7. A method according to claim 1, wherein said step of centering the annular blade includes positioning the annular blade so that an inside diameter of the annular blade is at least 1/16 of an inch greater than the external diameter of said rim.

8. A method according to claim 1, wherein said solid rubber tire comprises a forklift tire, and wherein said solid tubular rim comprises a steel rim.

9. A method of tearing a solid rubber forklift tire tread from a solid steel rim to which the tread is vulcanized, comprising the steps of:

placing a mechanism against one annular surface of the steel rim such that the mechanism has an external diameter which is greater than an internal diameter of the steel rim but less than an outside diameter of the steel rim;

placing a blunt annular blade on a surface of the tire tread opposite to said mechanism, said annular blade having a blunt, continuous annular surface which is substantially parallel to a plane which is orthogonal to a longitudinal axis of said steel rim, the annular blade having an inside diameter which is at least 1/16 of an inch longer than the outside diameter of the steel rim;

causing relative motion between said annular blade and said mechanism along said longitudinal axis to cause said blunt edge of the annular blade to tear through the entire solid rubber tire tread about an external circumference of the steel rim to separate the solid rubber tire tread from the steel rim.

10. A method according to claim 9, further comprising the step of holding said mechanism stationary while moving said annular blade against said mechanism.

11. A method according to claim 9, wherein said causing step causes the tire tread to be torn and not cut from the steel rim.

12. A method according to claim 9, further comprising the step of using a press to perform said causing step, wherein said press comprises a hydraulic cylinder and a piston, the hydraulic cylinder for extending the piston and causing the respective motion between the annular blade and the mechanism.

13. A method according to claim 9, wherein said mechanism is placed so that a portion thereof extends inside the internal diameter of the steel rim in a direction toward the annular blade.

14. A method according to claim 9, wherein the annular blade comprises a steel annular blade, and wherein the mechanism comprises a steel mechanism.

15. A method according to claim 9, wherein the step of causing relative motion between the annular blade and the mechanism comprises the step of moving either the annular blade or the mechanism with a force of 2–20 tons.

16. A method according to claim 9, wherein the annular blade comprises a blunt annular blade having a blunt edge with a radius of curvature of substantially 10 thousandths of an inch.

* * * * *